United States Patent
Kim

(10) Patent No.: US 9,481,779 B2
(45) Date of Patent: Nov. 1, 2016

(54) FLUORESCENT INK COMPOSITION, AND PREPARATION METHOD THEREFOR

(71) Applicant: Hee Joon Kim, Gumi-si (KR)

(72) Inventor: Hee Joon Kim, Gumi-si (KR)

( * ) Notice: Subject to any disclaimer, the term of this patent is extended or adjusted under 35 U.S.C. 154(b) by 70 days.

(21) Appl. No.: 14/440,360

(22) PCT Filed: Nov. 14, 2013

(86) PCT No.: PCT/KR2013/010351
§ 371 (c)(1),
(2) Date: May 4, 2015

(87) PCT Pub. No.: WO2014/077603
PCT Pub. Date: May 22, 2014

(65) Prior Publication Data
US 2015/0275056 A1  Oct. 1, 2015

(30) Foreign Application Priority Data

Nov. 16, 2012 (KR) .......... 10-2012-0130232
Nov. 14, 2013 (KR) .......... 10-2013-0138283

(51) Int. Cl.
| | | |
|---|---|---|
| *C09J 167/06* | (2006.01) | |
| *C08K 3/00* | (2006.01) | |
| *C09D 133/06* | (2006.01) | |
| *C09J 133/06* | (2006.01) | |
| *C09D 167/06* | (2006.01) | |
| *C09D 11/50* | (2014.01) | |
| *C08F 220/28* | (2006.01) | |

(52) U.S. Cl.
CPC .......... *C08K 3/0033* (2013.01); *C09D 11/50* (2013.01); *C09D 133/068* (2013.01); *C09D 167/06* (2013.01); *C09J 133/068* (2013.01); *C09J 167/06* (2013.01); *C08F 2220/285* (2013.01)

(58) Field of Classification Search
CPC .. C08K 3/0033; C09D 11/00; C09D 167/06; C09J 167/06

USPC .......... 252/301.34, 301.36; 524/37–40, 513
See application file for complete search history.

(56) References Cited

U.S. PATENT DOCUMENTS

| | | | |
|---|---|---|---|
| 2007/0092758 | A1 | 4/2007 | Lee et al. |
| 2008/0230748 | A1 | 9/2008 | Yoon et al. |
| 2009/0050850 | A1 | 2/2009 | Fukui et al. |
| 2015/0329771 | A1* | 11/2015 | Danielec ............ C09K 11/02 428/221 |

FOREIGN PATENT DOCUMENTS

| | | |
|---|---|---|
| CN | 101175833 A | 5/2008 |
| JP | 09-012979 A | 1/1997 |
| JP | 10-101845 A | 4/1998 |
| JP | 2003-25314 A | 9/2003 |
| JP | 2008-050594 A | 3/2008 |
| KR | 10-2003-0086841 A | 11/2003 |
| KR | 10-2007-0043151 A | 4/2007 |
| KR | 10-2007-0116639 A | 12/2007 |

OTHER PUBLICATIONS

International Search Report for PCT/KR2013/010351 mailed Dec. 30, 2013 from Korean Intellectual Property Office.

* cited by examiner

*Primary Examiner* — Edward Cain
(74) *Attorney, Agent, or Firm* — Revolution IP, PLLC

(57) ABSTRACT

The present invention relates to an adhesive varnish composition having remarkably improved optical loss and haze values for use in an optical material, and a method for preparing the same. Specifically, an adhesive varnish prepared by the method according to the present invention shows high light transmittance and can prevent yellowing by maintaining the stable dispersion of a filler due to a high viscosity. In addition, the adhesive varnish according to the present invention can be applied to various fields such as a silicon film, a diffusion sheet, a reflective sheet, a reflector, an LED, an LED package, a COB, and the like.

23 Claims, No Drawings

FLUORESCENT INK COMPOSITION, AND PREPARATION METHOD THEREFOR

CROSS REFERENCE TO PRIOR APPLICATIONS

This application is a National Stage Application of PCT International Patent Application No. PCT/KR2013/010351 filed on Nov. 14, 2013, under 35 U.S.C. §371, which claims priority to Korean Patent Application No. 10-2012-0130232 filed on Nov. 16, 2012 and Korean Patent Application No. 10-2013-0138283 filed on Nov. 14, 2013, which are all hereby incorporated by reference in their entirety.

FIELD OF THE INVENTION

The present invention relates to an adhesive varnish composition including a fluorescent filler and a preparation method therefor.

BACKGROUND ART

An inorganic particle paste composition, which is configured by dispersing inorganic particles, such as conductive powder, ceramic powder, and so on, on a binder resin, is being used in order to gain diverse forms of plastic bodies. Most particularly, a fluorescent paste composition, which is configured by dispersing a fluorescent substance on a binder resin in the form of inorganic particles, is being used in LED or organic EL, and so on, and its demand has recently been increasing.

After being processed to a predetermined form by using methods, such as a deposition method using screen printing, Doctor Blade, and so on, a casting method for processing to a sheet form, and so on, the fluorescent paste composition, may be plasticized and then used.

As the binder resin being used in the fluorescent paste composition, a cellulose-based resin, such as ethyl cellulose having thixotropic properties, is generally used. However, the fluorescent paste composition, which is configured by dispersing a fluorescent substance on the cellulose-based resin, is not thermally decomposed unless it is plasticized at a high temperature. Therefore, there was a problem of a large amount of energy being required during the production process, or a problem of an extended plasticization time.

With respect to such problems, a method of using an acrylic-based resin, which can be degreased at a lower temperature as compared to the cellulose-based resin, is being considered. For example, a fluorescent paste composition using an acrylic-based resin is disclosed in Japanese Patent Laid-Open Publication No. H9-0129797. However, treatment of such fluorescent paste composition is difficult due to its strong adhesive property, which results from the acrylic-based resin. Although the adhesive property can be decreased by adjusting the added amount of the acrylic-based resin, since the viscosity of the fluorescent paste composition may be remarkably degraded accordingly, in case of dispersing high specific-gravity fluorescent substance, a problem of sedimentation or flocculation (or coagulation) of the fluorescent substance, which is also known as a decrease in storage stability, occurred.

Accordingly, by increasing the molecular weight (or mass) of the acrylic-based resin, the added amount of the acrylic-based resin may be reduced, and by increasing the viscosity of the fluorescent paste composition, the storage stability may be maintained, In the Japanese Patent Laid-Open Publication No. 2003-257314, in order to enhance dispersibility of the fluorescent substance, a method of adding a compound having one or more carboxyl groups, such as Stearic acid, to a fluorescent paste composition is disclosed. It is disclosed herein that, by adding a compound having one or more carboxyl groups, the carboxyl group is adsorbed on the surface of the fluorescent surface causing surface potential to be neutralized or hydrogen bonding areas to be inactivated, and that, due to a volumetric effect of areas other than the carboxyl group, flocculation (or coagulation) may be controlled and the dispersibility of the fluorescent substance may be enhanced. However, when using this method, due to its difficulty in maintaining storage stability for a long period of time, sedimentation or flocculation (or coagulation) of the fluorescent substance occurred in some cases. Additionally, a fluorescent paste composition having low viscosity yielded a problem of a distinctive change in viscosity. As described above, a solution for realizing light transmittance and haze characteristics by ensuring the dispersibility of the fluorescent substance, thereby enhancing long-term storage stability of the fluorescent paste composition, is being required.

DETAILED DESCRIPTION OF THE INVENTION

Technical Objects

An object of the present invention is to provide an adhesive varnish, as an optical material, and a preparation method therefor, which can reduce optical loss and enhance light transmittance.

More specifically, an object of the present invention is to provide an adhesive varnish that can remarkably enhance light transmittance and that can provide stable dispersion of a fluorescent filler at the same time.

Additionally, an object of the present invention is to provide an adhesive varnish yielding excellent discoloration resistance and weather resistance, due to its beneficial coating against light source, and having excellent dispersion stability and long-term storage stability.

An object of the present invention is to provide an adhesive varnish and a preparation method therefor that can have a high light transmittance and a low haze, by being applied to a diffusion sheet, a reflective sheet, LED, a reflector, and so on, and that can maximize its light efficiency (or luminance efficiency).

Technical Solutions

In order to achieve the above-described object, the present invention may provide an adhesive varnish composition including a binder resin mixture containing a polyester-based resin, an acrylic-based resin, a cellulose-based resin, and a diluent, a fluorescent filler, and a solvent.

In the present invention, being configured of a binder resin mixture using the polyester-based resin, the acrylic-based resin, and the cellulose-based resin at the same time, dispersion stability of the fluorescent filler may be remarkably increased, and the long-term storage stability may be maximized, and, when being coated on a paint film, even though its thickness is thick, the haze may be reduced, and the light transmissivity may be enhanced, thereby remarkably enhancing optical efficiency. This may be achieved by a combination of the above-described components, and, when the present invention is deviated from the combination of the above-described components, light transmissivity and haze characteristics may be degraded, and the long-term storage stability may also be degraded, thereby causing degradation in the dispersibility due to sedimentation, phase separation, and flocculation of the fluorescent filler or due to an increase in the viscosity.

The composition according to an exemplary embodiment of the present invention may include a binder resin mixture 25~60% by weight, a fluorescent filler 30~70% by weight, and a solvent 5~20% by weight.

In the composition according to an exemplary embodiment of the present invention, the binder resin mixture may include a polyester-based resin 5~40% by weight, an acrylic-based resin 10~45% by weight, a cellulose-based resin 5~30% by weight, and a diluent 5~20% by weight.

In the composition according to an exemplary embodiment of the present invention, the composition may have a viscosity within a range of 5,000~30,000 cP.

In the composition according to an exemplary embodiment of the present invention, the cellulose-based resin may have a weight-average molecular weight ranging from 30,000 to 40,000 g/mol.

In the composition according to an exemplary embodiment of the present invention, the cellulose-based resin may correspond to any one or two or more cellulose esters selected from a group consisting of cellulose acetate, cellulose propionate, cellulose butyrate, cellulose acetate propionate, cellulose acetate butyrate, cellulose acetate phthalate, and cellulose phthalate.

In the composition according to an exemplary embodiment of the present invention, the acrylic-based resin may include one of or a compound of two or more of acrylic polyol, acrylic acid copolymer, modified acrylic acid copolymer, and polyacrylate.

The composition according to an exemplary embodiment of the present invention may further include a silicon-based compound.

The present invention may provide a preparation method for an adhesive varnish composition including, comprising (a) a preparation step for a binder resin mixture, wherein the binder resin mixture containing a polyester-based resin, an acrylic-based resin, a cellulose-based resin, and a diluent is agitated at 80 to 180° C., and (b) a preparation step for a fluorescent ink, wherein a fluorescent filler and a solvent are added to the binder resin mixture prepared in step (a), and wherein the mixture is agitated within a temperature range of 25 to 100° C.

In the preparation method for the adhesive varnish composition according to an exemplary embodiment of the present invention, the composition may include a binder resin mixture 25~60% by weight, a fluorescent filler 30~70% by weight, and a solvent 5~20% by weight.

In the preparation method for the adhesive varnish composition according to an exemplary embodiment of the present invention, the binder resin mixture may include a polyester-based resin 5~40% by weight, an acrylic-based resin 10~45% by weight, a cellulose-based resin 5~30% by weight, and a diluent 5~20% by weight.

In the preparation method for the adhesive varnish composition according to an exemplary embodiment of the present invention, the composition may have a viscosity within a range of 5,000~15,000 cP.

In the preparation method for the adhesive varnish composition according to an exemplary embodiment of the present invention, the solvent may be selected from dimethyl cyclohexylamine, methyl ethyl ketone, cyclohexanone, propylene glycol monomethylether, ethylene glycol monobutyl ether acetate, xylene, ethyl acetate, dipropylene glycol mono methylether, normal butyl acetate, butyl glycol, or selected from a mixture of the above.

In the preparation method for the adhesive varnish composition according to an exemplary embodiment of the present invention, the agitation in step (b) may be performed by selecting any one or more methods of dispersion performed by high-speed agitation, dispersion performed by a roll mill, and dispersion performed by a dispersing agent.

The present invention may provide a light-emitting diode or a LED package including the adhesive varnish composition.

Effects of the Invention

The adhesive varnish according to the present invention may extend the range of usage and application of the optical material by maximizing light transmittance while remarkably reducing optical loss. Additionally, while maximizing the light-emitting efficiency by increasing light transmissivity, coating is advantageous against the light source in preventing yellowing, and, due to its high viscosity, stable dispersion of the filler may be carried out, and, therefore, the adhesive varnish according to the present invention is advantageous in that it can be easily applied to diffusion sheets, reflective sheets, LEDs, reflectors, and so on.

BEST MODE FOR CARRYING OUT THE PRESENT INVENTION

Hereinafter, the present invention will be described in detail.

The present invention may include a binder resin mixture containing a polyester-based resin, an acrylic-based resin, a cellulose-based resin, and a diluent, a fluorescent filler, and a solvent.

The composition may include a binder resin mixture 25~60% by weight, a fluorescent filler 30~70% by weight, and a solvent 5~20% by weight.

At this point, the binder resin mixture may include a polyester-based resin 5~40% by weight, an acrylic-based resin 10~45% by weight, a cellulose-based resin 5~30% by weight, and a diluent 5~20% by weight.

Additionally, in the present invention, the composition may further include a silicon-based compound in order to increase fusibility and miscibility by increasing its reactivity with other components including polyester and to yield a synergy effect in physical properties, such as weather resistance, light efficiency (or luminance efficiency), and so on.

The silicon-based compound may correspond to a compound having two or more saturated reactors at its terminal or its side chain, and, preferably, an organic compound having an organic substance existing at its terminal may be used. For example, dimethylsiloxane having a dimethylvinyl group at its terminal, dimethylvinylated silica or trimethylated silica, silica that is surface-treated with methacryloxypropyltrimethoxysilane, and so on, may be used, but the compounds will not be limited only to this.

A resin that is prepared by a polycondensation reaction of a polybasic acid and a polyhydric alcohol may be used as the polyester-based resin. For example, aromatic saturated dibasic acids, such as phthalic anhydride, isophthalic acid, terephthalic acid, and so on, unsaturated dibasic acids, such as maleic anhydride, fumaric acid, itaconic acid, citraconic acid, and so on, tribasic acids, such as trimellitic anhydride, and so on, and so on, may be used as the polybasic acid. Additionally, aliphatic saturated dibasic acids, such as adipic acid, azelaic acid, sebacic acid, tetrahydrophthalic anhydride, hexahydrophthalic anhydride, tetrachlorophthalic anhydride, and so on, may be used as the above-described polybasic acid derivative. The polyhydric alcohol may be used in combination with a diol containing a side chain or a polyol of an acidic group or more. Examples of the diol containing a side chain may include Neo-pentyl glycol, 1,4-butanediol, Propylene glycol, and so on, and, as the polyol of three- or more groups, Trimethylol propane (Trimethyrol propane), Pentaerythritol, glycerin, and so on, may be used.

The polyester-based resin may be included 5~40% by weight and, preferably, 5~30% by weight of the total weight of the binder resin compound.

A weight-average molecular weight of the polyester-based resin may be equal to a range of 10,000 to 100,000 and, preferably, a range of 20,000 to 50,000. Additionally, it is preferable that acrylic modified polyester is used as the polyester-based resin. When deviating from the above-mentioned range, miscibility with other components becomes excellent, viscosity control becomes easier, and, when forming a paint film, flatness, dispersibility, and uniformity become excellent.

The acrylic-based resin may include one of or a compound of two or more of acrylic polyol, acrylic acid copolymer, modified acrylic acid copolymer, and polyacrylate.

For example, the compound that may be used herein may be prepared (or produced) by polymerizing a monomer, which is selected from acrylic acid, methacrylic acid, alkyl glycidyl ether acrylate of carbon numbers 2~8, such as ethyl glycidyl ether acrylate, ethyl glycidyl ether methacrylate, propyl glycidyl ether acrylate, propyl glycidyl ether methacrylate, butyl glycidyl ether methacrylate, and so on, benzimidazole, methyl acrylate, methyl alcohol acrylate, glycidyl methacrylate, phenyl glycidyl methacrylate, phenyl glycidyl ehter methacrylate; tricyclodecyl methacrylate, phenyl acrylate, phenyl methacrylate, benzyl acrylate, benzyl methacrylate, 2 or 4-methoxyphenyl acrylate, 2 or 4-methoxyphenyl methacrylate, 2 or 4-methoxybenzyl acrylate, 2 or 4-methoxybenzyl methacrylate, 2 or 4-ethoxyphenyl acrylate, 2 or 4-ethoxyphenyl methacrylate, 2 or 4-ethoxybenzyl acrylate, 2 or 4-ethoxybenzyl methacrylate, 2 or 4-chlorophenyl acrylate, 2 or 4-chlorophenyl methacrylate, 2 or 4-chlorobenzyl acrylate, 2 or 4-chlorobenzyl methacrylate, 2 or 4-bromophenyl acrylate, 2 or 4-bromophenyl methacrylate, 2 or 4-bromobenzyl acrylate, and 2 or 4-bromobenzyl methacrylate, by using a general method by adding an initiator to the selected monomer.

An acrylic polyol resin may preferably used as the acrylic-based resin. The acrylic polyol resin may be used in order to maximize the optical characteristics. This may use an acrylic copolymer, which corresponds to a compound of a monovinyl monomer and a divinyl monomer that is polymerized by using an initiator, and it will be more preferable to use an acrylic copolymer having a nonvolatile ingredient content of 40~70% by weight, a Gardner bubble viscosity of N~Z 5, an acid value of 0~10, and a color of 0~3. At this point, a divinyl methacrylate may be used as the divinyl monomer. In case of being combined with a cellulose-based resin having butyrate groups and propionate groups, it will be preferable to use a long-chain divinyl (meth)acrylate having a large number of hydrocarbon-based compounds.

The acrylic-based resin may be included in the binder resin mixture as 10~45% by weight of the total weight of the binder resin mixture, and, preferably, 10~40% by weight may be included.

If the nonvolatile ingredient content is less than 40% by weight, the content of volatile solvent may be increased, and gloss and film thickness may be degraded due to the extended formation time of the paint film, and, if the content exceeds 70% by weight, synthesis may be realized at a high viscosity or compatibility of the cellulose-based resin may be degraded. Additionally, if the Gardner bubble viscosity is less than N, the viscosity and molecular weight may be decreased, and, if it exceeds Z 5, additional dilution solvent may be required due to the high viscosity level, which results in an increase in an organic volatile solvent.

Additionally, it will be preferable for the physical characteristics and chemical resistance of the acrylic polyol resin that, within the resin composition, the hydroxyl group content is 1~3% by weight with respect to the non-volatile ingredient, and that the level of molecular weight distribution is with a range of 1.0~6.0.

The cellulose-based resin may correspond to cellulose ester, alkyl cellulose or nitro cellulose, and, preferably, any one or two or more cellulose esters selected from a group consisting of cellulose acetate, cellulose propionate, cellulose butyrate, cellulose acetate propionate, cellulose acetate butyrate, cellulose acetate phthalate, and cellulose phthalate may be used as the cellulose-based resin.

The cellulose-based resin having a weight-average molecular weight (Mw) ranging from 30,000 to 40,000 may be used, and it will be preferable to mix the cellulose-based resin with an acrylic-based resin at a mixed weight ratio of 1:1.5 to 1:5 for miscibility, dispersion stability of the composition, and yellowing reduction.

A solvent selected from dimethyl cyclohexylamine, methyl ethyl ketone, cyclohexanone, propylene glycol monomethylether, ethylene glycol monobutyl ether acetate, xylene, ethyl acetate, dipropylene glycol mono methylether, normal butyl acetate, butyl glycol, or selected from a mixture of the above may be used as the diluent (or thinner).

A general fluorescent substance may be used as the fluorescent filler. For example, SDY555-7, R625, and so on, of YANTAI SHIELD ADVANCED MATERIALS may be used, and the fluorescent substance will not be limited only to this.

In the present invention, the viscosity of the adhesive varnish composition may be within the range of 5,000~30,000 cP. A composition satisfying the above-described viscosity range may reduce optical loss and may maximize the light transmittance rate due to the stable dispersion of the fluorescent filler.

The present invention may provide a preparation method for an adhesive varnish composition comprising (a) a preparation step for a binder resin mixture, wherein the binder resin mixture containing a polyester-based resin, an acrylic-based resin, a cellulose-based resin, and a diluent is agitated at 80 to 180° C.; and (b) a preparation step for a fluorescent ink, wherein a fluorescent filler and a solvent are added to the binder resin mixture prepared in step (a), and wherein the mixture is agitated within a temperature range of 25 to 100° C.

In step (a), the above-described binder resin mixture may be used as the binder resin mixture, and, by adjusting its viscosity by using a diluent (or thinner), the liquidity of the composition may be increased, thereby enhancing the miscibility of the components and increasing dispersion stability at the same time.

At this point, for better compatibility, it will be preferable to perform the viscosity adjustment process within a temperature range of 25° C. to 100° C. Additionally, it will be preferable to adjust the viscosity to a range of 5,000 to 15,000 cP.

The solvent may be selected from dimethyl cyclohexylamine, methyl ethyl ketone, cyclohexanone, propylene glycol monomethylether, ethylene glycol monobutyl ether acetate, xylene, ethyl acetate, dipropylene glycol mono methylether, normal butyl acetate, butyl glycol, or selected from a mixture of the above, and the solvent will not be limited only to this.

A fluorescent filler is added to the binder resin mixture having its viscosity adjusted, and, then, agitation is performed on the mixture by selecting any one or more of the methods of dispersion performed by high-speed agitation, dispersion performed by a roll mill, and dispersion performed by a dispersing agent (or dispersant), and, preferably, it will be advantageous to perform dispersion performed by high-speed agitation by using a homogenizer or to perform alternated dispersion with the dispersion performed by a roll mill. At this point, it will be preferable that the agitation speed is within the range of 500 to 2,000 rpm in order to prevent carbonization of the fluorescent substance. Thereafter, the agitated mixture includes a step of resting the agitated mixture in order to stabilize the agitated mixture.

It is preferable that the viscosity of the adhesive composition being mixed with the fluorescent filler is within the range of 5,000 to 30,000 cps.

Due to its advantages of excellent light transmittance rate and dispersion stability of the filler, the adhesive varnish composition according to the present invention may be easily applied to diffusion sheets, reflector sheets, LEDs, reflectors, and so on.

In an aspect, after depositing the adhesive varnish composition according to the present invention on a substrate made of materials, such as tempered glass, metal, PC, PMMA, PET, and so on, by using a silk screen printing method, by providing a LED package, wherein a fluorescent layer is formed by adding a plurality of LED chips being equipped with electrodes, it will be advantageous in that light transmissivity can be maximized and that, by preventing yellowing, the characteristics of long-term lifetime and durability.

The present invention may provide a light-emitting diode including the adhesive varnish composition.

The present invention may provide a LED package including the adhesive varnish composition.

The present invention may provide a blue laser diode including the adhesive varnish composition.

The present invention may provide a COB (chip on board) including the adhesive varnish composition.

Hereinafter, the present invention will be described in detail based upon the exemplary embodiments.

Embodiment 1

A binder resin mixture, which consists of a mixture of acrylic modified polyester (Nokwon C&I, PKI HF, weight-average molecular weight 35,000 g/mol) 25% by weight, acrylic polyol (Aekyung Chemical, A-811) 35% by weight, cellulose resin (EASTMAN Chemical Company, CBA-381-20) 25% by weight, and propylene glycol monomethyl ether 15% by weight, was agitated at 50° C. for 10 minutes, and, then, by increasing the temperature by 2° C. per minute, the mixture was agitated at 120° C. for 6 hours at 1000 rpm. After the agitation, a mixture consisting of a mixture of the binder resin mixture 60% by weight, propylene glycol monomethyl ether 15% by weight, and a fluorescent filler (R625, YANTAI SHIELD ADVANCED MATERIALS) 30% by weight was agitated at 50° C. for 1 hour at 800 rpm in a reactor including an impeller at a ¾ ratio. Thereafter, an adhesive varnish composition was prepared by performing agitation by using a 3-ROLL-MILL. The viscosity of the prepared composition was shown to be 6,560 cP (brookfield DV II pro+ spindle No. 64, 50 rpm, 25° C.)

Embodiment 2

With the exception for using the binder resin mixture 50% by weight, fluorescent substance 40% by weight, and propylene glycol monomethyl ether 10% by weight with respect to the total weight of the composition, the adhesive varnish was prepared by using the same method as Embodiment 1. The viscosity of the prepared composition was shown to be 6,563 cP.

Embodiment 3

With the exception for using the binder resin mixture 40% by weight, fluorescent substance 50% by weight, and propylene glycol monomethyl ether 10% by weight with respect to the total weight of the composition, the adhesive varnish was prepared by using the same method as Embodiment 1. The viscosity of the prepared composition was shown to be 6,575 cP.

Embodiment 4

With the exception for using the binder resin mixture 30% by weight, fluorescent substance 60% by weight, and propylene glycol monomethyl ether 10% by weight with respect to the total weight of the composition, the adhesive varnish was prepared by using the same method as Embodiment 1. The viscosity of the prepared composition was shown to be 7,498 cP.

Embodiment 5

With the exception for using the binder resin mixture 20% by weight, fluorescent substance 60% by weight, and propylene glycol monomethyl ether 20% by weight with respect to the total weight of the composition, the adhesive varnish was prepared by using the same method as Embodiment 1. The viscosity of the prepared composition was shown to be 1,920 cP.

(Comparison 1)

With the exception for not using acrylic modified polyester and acrylic polyol and for using the binder resin mixture by using cellulose resin 80% by weight and propylene glycol monomethyl ether 20% by weight, the adhesive varnish was prepared by using the same method as Embodiment 1. The viscosity of the prepared composition was shown to be 2,478 cP.

(Comparison 2)

With the exception for not using acrylic polyol and for using the binder resin mixture by using acrylic modified polyester 10% by weight, cellulose resin 80% by weight, and propylene glycol monomethyl ether 10% by weight, the adhesive varnish was prepared by using the same method as Embodiment 1. The viscosity of the prepared composition was shown to be 9,530 cP.

(Comparison 3)

With the exception for not using acrylic modified polyester and for using the binder resin mixture by using acrylic polyol 10% by weight, cellulose resin 80% by weight, and propylene glycol monomethyl ether 10% by weight, the adhesive varnish was prepared by using the same method as Embodiment 1. The viscosity of the prepared composition was shown to be 5,520 cP.

(Comparison 4)

With the exception for adjusting the temperature range to 50° C. when preparing the binder resin mixture, the adhesive varnish was prepared by using the same method as Embodiment 1. The viscosity of the prepared composition was shown to be 1,110 cP.

(Evaluation)

The adhesive varnish composition of the embodiment or comparison (or comparison example) was Silk screen printed on a plastic sample made of PMMA (poly(methyl methacrylate)), which is then dried for 30 minutes at 60° C., thereby obtaining a paint film. The sample including the paint film had its Haze Value and light transmissivity measured by using a SpectroPhotometer (CM-3700d) in accordance with method JIS K 7105 and also had its paint film thickness measured by using a Low Vacuum Scanning Electron Microscope (Quanta 400).

With respect to the long-term storage stability, after preserving the adhesive varnish composition for 30 days at 23° C., the presence or absence the presence or absence of phase separation in a solution and sedimentation of the fluorescent filler are verified through the naked eyes, and, then, evaluation has been made in accordance with the reference standard shown below.

◯: Phase separation in solution, sedimentation of fluorescent filler, and so on, are not shown.

X: Composition is phase-separated, and sedimentation of the fluorescent filler or a particle layer has been observed, and the viscosity of the supernatant has been degraded.

TABLE 1

| Classification | Emb. 1 | Emb. 2 | Emb. 3 | Emb. 4 | Emb. 5 | Comp. 1 | Comp. 2 | Comp. 3 | Comp. 4 |
|---|---|---|---|---|---|---|---|---|---|
| Haze (%) | 88.40 | 88.51 | 89.96 | 90.07 | 96.37 | 93.82 | 92.82 | 95.48 | 93.71 |
| Light Transmittance (%) | 73.73 | 70.23 | 64.82 | 61.32 | 60.03 | 62.47 | 66.36 | 59.44 | 69.31 |
| Long-term Storage Stability | ◯ | ◯ | ◯ | ◯ | ◯ | X | X | X | X |
| Thickness of Paint Film (μm) | 7.67 | 8.07 | 9.69 | 10.50 | 10.85 | 7.86 | 7.98 | 9.64 | 8.21 |

As a result of measuring the light transmissivity and haze value of the paint film, it may be verified that, as compared to the paint film of the comparison example, the paint film according to the exemplary embodiment of the present invention has less optical loss, due to its high light transmissivity and low haze value, and that its optical efficiency can be enhanced.

As described above, although the present invention has been described based upon a limited set of exemplary embodiments, this is merely provided to further facilitate the overall understanding of the present invention, and, therefore, the present invention will not be limited only to the above-described exemplary embodiments, and diverse amendments and modifications may be realized from this description by anyone skilled in the field to which the present invention belongs.

Therefore, it should be understood that the spirit of the present invention shall not be decided based only upon the above-described exemplary embodiments, and it should also be understood that the appended claims, which will be described below, as well as everything including modifications that are identical or equivalent to the claims of the present invention belong to the scope of the spirit of the present invention.

What is claimed is:

1. An adhesive varnish composition, comprising:
   a binder resin mixture containing a polyester-based resin, an acrylic-based resin, a cellulose-based resin, and a diluent, a fluorescent filler, and a solvent.

2. The adhesive varnish composition of claim 1, wherein the composition includes a binder resin mixture 25~60% by weight, a fluorescent filler 30~70% by weight, and a solvent 5~20% by weight.

3. The adhesive varnish composition of claim 1, wherein the binder resin mixture includes a polyester-based resin 5~40% by weight, an acrylic-based resin 10~45% by weight, a cellulose-based resin 5~30% by weight, and a diluent 5~20% by weight.

4. The adhesive varnish composition of claim 1, wherein the composition has a viscosity within a range of 5,000~30,000 cP.

5. The adhesive varnish composition of claim 1, wherein the cellulose-based resin has a weight-average molecular weight (Mw) ranging from 30,000 to 40,000 g/mol.

6. The adhesive varnish composition of claim 1, wherein the cellulose-based resin corresponds to any one or two or more cellulose esters selected from a group consisting of cellulose acetate, cellulose propionate, cellulose butyrate, cellulose acetate propionate, cellulose acetate butyrate, cellulose acetate phthalate, and cellulose phthalate.

7. The adhesive varnish composition of claim 1, wherein the acrylic-based resin includes one of or a compound of two or more of acrylic polyol, acrylic acid copolymer, modified acrylic acid copolymer, and polyacrylate.

8. The adhesive varnish composition of claim 1, wherein the composition further includes a silicon-based compound.

9. A preparation method for an adhesive varnish composition, comprising:
   (a) a preparation step for a binder resin mixture, wherein the binder resin mixture containing a polyester-based resin, an acrylic-based resin, a cellulose-based resin, and a diluent is agitated at 80 to 180° C.; and
   (b) a preparation step for a fluorescent ink, wherein a fluorescent filler and a solvent are added to the binder resin mixture prepared in step (a), and wherein the mixture is agitated within a temperature range of 25 to 100° C.

10. The preparation method of claim 9, wherein the composition includes a binder resin mixture 25~60% by weight, a fluorescent filler 30~70% by weight, and a solvent 5~20% by weight.

11. The preparation method of claim 9, wherein the binder resin mixture includes a polyester-based resin 5~40% by weight, an acrylic-based resin 10~45% by weight, a cellulose-based resin 5~30% by weight, and a diluent 5~20% by weight.

12. The preparation method of claim 9, wherein the composition has a viscosity within a range of 5,000~15,000 cP.

13. The preparation method of claim 9, wherein a silicon-based compound is further included in the (b) step.

14. The preparation method of claim 9, wherein the solvent is selected from dimethyl cyclohexylamine, methyl ethyl ketone, cyclohexanone, propylene glycol monomethylether, ethylene glycol monobutyl ether acetate, xylene, ethyl acetate, dipropylene glycol mono methylether, normal butyl acetate, butyl glycol, or selected from a mixture of the above.

15. The preparation method of claim 9, wherein the agitation in step (b) is performed by selecting any one or more methods of dispersion performed by high-speed agitation, dispersion performed by a roll mill, and dispersion performed by a dispersing agent.

16. A light-emitting diode including any one composition selected from the composition of claim 1.

17. A LED package including the composition of claim 1.

18. A blue laser diode including the composition of claim 1.

19. A COB package including the composition of claim 1.

20. A light-emitting diode including the composition prepared by the preparation method of claim 9.

21. A LED package including the composition prepared by the preparation method of claim 9.

22. A blue laser diode including the composition prepared by the preparation method of claim 9.

23. A COB package including the composition prepared by the preparation method of claim 9.

* * * * *